(12) United States Patent
Lee et al.

(10) Patent No.: US 9,436,894 B2
(45) Date of Patent: Sep. 6, 2016

(54) IMAGE ALIGNMENT APPARATUS AND IMAGE ALIGNMENT METHOD OF USING THE SAME

(71) Applicant: HANWHA TECHWIN CO., LTD., Changwon-si (KR)

(72) Inventors: Joon Sung Lee, Changwon (KR); Jae Yoon Oh, Changwon (KR); Gon Soo Kim, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 298 days.

(21) Appl. No.: 14/178,008

(22) Filed: Feb. 11, 2014

(65) Prior Publication Data

US 2015/0055873 A1 Feb. 26, 2015

(30) Foreign Application Priority Data

Aug. 20, 2013 (KR) .......................... 10-2013-0098607

(51) Int. Cl.

| G06K 9/36 | (2006.01) |
|---|---|
| G06T 3/00 | (2006.01) |
| G06K 9/62 | (2006.01) |
| G06T 7/00 | (2006.01) |
| G06T 7/20 | (2006.01) |

(52) U.S. Cl.
CPC ............ *G06K 9/6289* (2013.01); *G06T 7/003* (2013.01); *G06T 7/2006* (2013.01); *G06T 7/2033* (2013.01); *G06T 2207/10021* (2013.01)

(58) Field of Classification Search
None
See application file for complete search history.

(56) References Cited

U.S. PATENT DOCUMENTS

| 2011/0150275 | A1* | 6/2011 | Tong ..................... G06T 3/0068 382/103 |
|---|---|---|---|
| 2011/0205368 | A1 | 8/2011 | Ostromek et al. |
| 2012/0148164 | A1 | 6/2012 | Suk et al. |
| 2012/0218442 | A1* | 8/2012 | Jandhyala ................. G06T 7/20 348/239 |
| 2014/0254882 | A1* | 9/2014 | Jin .......................... G06T 7/003 382/107 |

FOREIGN PATENT DOCUMENTS

| JP | 4971301 B2 | 7/2012 |
|---|---|---|
| KR | 10-1051716 B1 | 7/2011 |
| KR | 10-2011-0117455 A | 10/2011 |
| KR | 10-2012-0063858 A | 6/2012 |

* cited by examiner

*Primary Examiner* — Brian P Werner
(74) *Attorney, Agent, or Firm* — Sughrue Mion, PLLC

(57) ABSTRACT

Provided are an image alignment apparatus and an image alignment method using the same. The image alignment apparatus includes a first conversion function estimation unit for estimating a first conversion function based on feature point information that is extracted from a first image, which is captured by using a first image sensor, and a second image, which is captured by using a second image; and a second conversion function estimation unit for estimating a second conversion function based on motion information that is extracted from the first image and the second image.

19 Claims, 8 Drawing Sheets

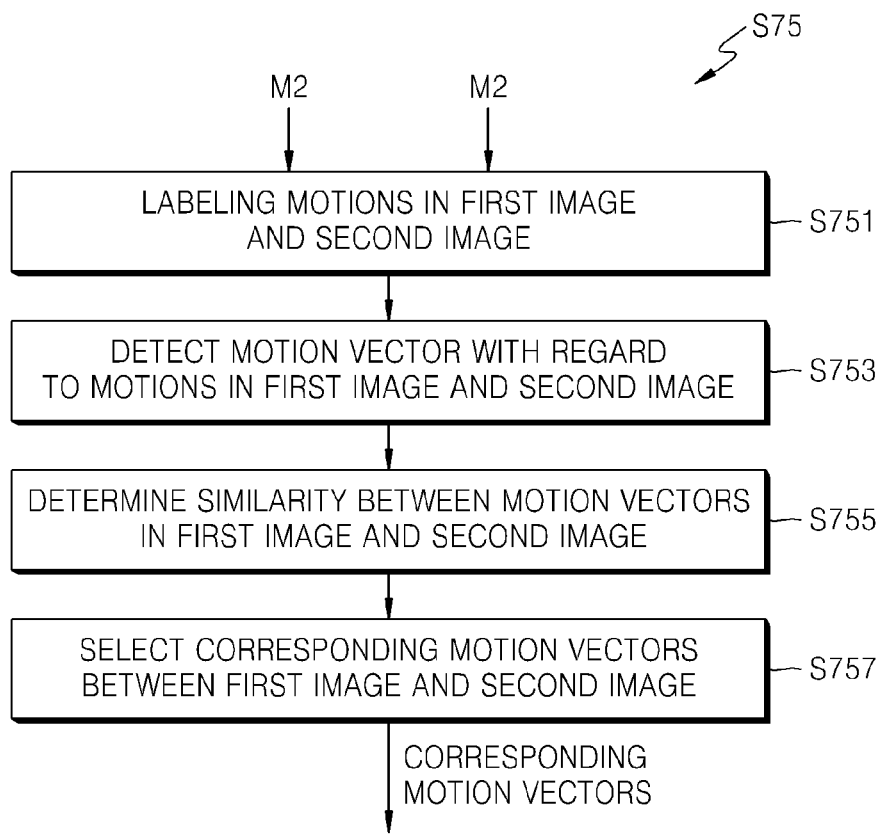

IMAGE ALIGNMENT APPARATUS AND IMAGE ALIGNMENT METHOD OF USING THE SAME

RELATED APPLICATIONS

This application claims priority from Korean Patent Application No. 10-2013-0098607, filed on Aug. 20, 2013, in the Korean Intellectual Property Office, the disclosure of which is incorporated herein in its entirety by reference.

BACKGROUND

1. Field

Apparatuses and methods consistent with exemplary embodiments relate to image alignment.

2. Description of the Related Art

Recently, in order to improve accuracy and reliability of an algorithm for detection of a change, motion detection, restoration of a super-resolution image, or recognition and tracking of an object in the field of a monitoring system and a medical image, a research on complementary information fusion using two or more sensors is briskly performed.

SUMMARY

One or more exemplary embodiments provide an image alignment apparatus and an image alignment method using the same.

Various aspects of the exemplary embodiments will be set forth in part in the description which follows and, in part, will be apparent from the description, or may be learned by practice of these embodiments.

According to an aspect of an exemplary embodiment, there is provided an image alignment apparatus which may include: a first conversion function estimation unit for estimating a first conversion function based on feature point information that is extracted from a first image, which is captured by using a first image sensor, and a second image, which is captured by using a second image; and a second conversion function estimation unit for estimating a second conversion function based on motion information that is extracted from the first image and the second image.

The image alignment apparatus may further include a conversion function selection unit for, according to whether the first conversion function is estimated, selecting the first conversion function or the second conversion function as a final conversion function.

If the first conversion function is not estimated or periodically, the second conversion function selection unit may estimate the second conversion function.

The first conversion function selection unit may include: a feature point detection unit for detecting feature points in the first image and the second image, respectively; a feature point selection unit for selecting corresponding feature points from among the detected feature points in the first image and the second image; and a first estimation unit for estimating the first conversion function based on the selected corresponding feature points.

The feature point selection unit may include: a patch image obtaining unit for obtaining patch images having the feature points in the first image and the second image at centers of the patch images, respectively; a candidate selection unit for, with regard to the feature point in the first image, selecting candidate feature points in the second image, which correspond to the feature point in the first image; a similarity determination unit for determining a similarity between the patch image of the feature point in the first image and the patch images of the candidate feature points in the second image; and a corresponding feature point selection unit for, based on a result of the determining of the similarity, selecting the corresponding feature points from among the feature point in the first image and the candidate feature points in the second image.

The second conversion function estimation unit may include a motion detection unit for detecting motions in the first image and the second image, respectively; a motion vector selection unit for selecting corresponding motion vectors from among motion vectors that are detected from the detected motions in the first image and the second image; and a second estimation unit for estimating the second conversion function based on the selected corresponding motion vectors.

The motion vector selection unit may include a labeling unit for labeling each of the detected motions that are detected from the first image and the second image; a motion vector detection unit for detecting motion vectors with regard to the labeled motions in the first image and the second image; a similarity determination unit for determining a similarity between the detected motion vectors in the first image and the second image; and a corresponding motion vector selection unit for, based on a result of the determining of the similarity, selecting corresponding motion vectors between the first image and the second image.

With regard to the motion vector in the first image, the similarity determination unit may select candidate motion vectors in the second image, and determine a similarity between the motion vector in the first image and the candidate motion vectors in the second image.

The similarity determination unit may determine the similarity based on a magnitude and a direction of the detected motion vectors.

The image alignment apparatus may further include an alignment unit for aligning the first image and the second image by using the selected first or second conversion function.

According to an aspect of another exemplary embodiment, there is provided an image alignment method which may include: estimating a first conversion function based on feature point information that is extracted from a first image, which is captured by using a first image sensor, and a second image, which is captured by using a second image; and estimating a second conversion function based on motion information that is extracted from the first image and the second image.

The image alignment method may further include, according to whether the first conversion function is estimated, selecting the first conversion function or the second conversion function as a final conversion function.

The estimating of the second conversion function may be performed, if the first conversion function is not estimated or periodically.

The estimating of the first conversion function may include: detecting feature points in the first image and the second image, respectively; selecting corresponding feature points from among the detected feature points in the first image and the second image; and estimating the first conversion function based on the selected corresponding feature points.

The selecting of the corresponding feature points may include: obtaining patch images having the feature points in the first image and the second image at the centers of the patch images, respectively; with regard to the feature point in the first image, selecting candidate feature points in the second image, which correspond to the feature point in the first image; determining a similarity between the patch image of the feature point in the first image and the patch images of the candidate feature points in the second image; and based on a result of the determining of the similarity, selecting the corresponding feature points from among the feature point in the first image and the candidate feature points in the second image.

The estimating of the second conversion function may include detecting motions in the first image and the second image, respectively; selecting corresponding motion vectors from among motion vectors that are detected from the detected motions in the first image and the second image; and estimating the second conversion function based on the selected corresponding motion vectors.

The selecting of the corresponding motion vectors may include: labeling each of the detected motions that are detected from the first image and the second image; detecting the motion vectors with regard to the labeled motions in the first image and the second image; determining a similarity between the detected motion vectors in the first image and the second image; and based on a result of the determining of the similarity, selecting corresponding motion vectors between the first image and the second image.

The determining of the similarity may include, with regard to the motion vector in the first image, selecting candidate motion vectors in the second image, and determining a similarity between the motion vector in the first image and the candidate motion vectors in the second image.

The determining of the similarity may include determining the similarity based on a magnitude and a direction of the detected motion vectors.

The image alignment apparatus may further include aligning the first image with the second image by using the selected first or second conversion function.

BRIEF DESCRIPTION OF THE DRAWINGS

These and/or other aspects will become apparent and more readily appreciated from the following description of the exemplary embodiments, taken in conjunction with the accompanying drawings, in which:

FIG. 9 is a flowchart for illustrating a method of selecting a corresponding motion vector, according to an exemplary embodiment.

DETAILED DESCRIPTION

Figure 1:
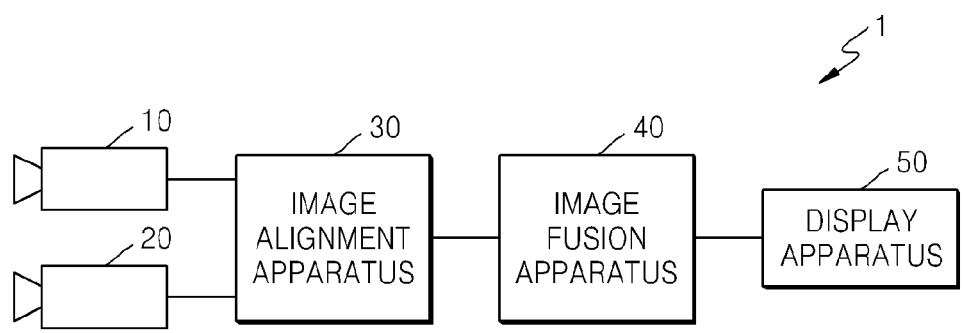
FIG. 1 is a schematic block diagram of an image fusion system according to an exemplary embodiment.

Reference will now be made in detail to exemplary embodiments which are illustrated in the accompanying drawings, wherein like reference numerals refer to like elements throughout. In this regard, these embodiments may have different forms, and the inventive concept should not be construed as being limited to the descriptions set forth herein. Accordingly, these embodiments are merely described below, by referring to the figures, to explain some aspects of the inventive concept. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The embodiment may be described in terms of functional block components and various processing steps. Such functional blocks may be realized by any number of hardware and/or software components configured to perform the specified functions. For example, the embodiment s may employ various integrated circuit components, e.g., memory elements, processing elements, logic elements, look-up tables, and the like, which may carry out a variety of functions under the control of one or more microprocessors or other control devices. Similarly, the elements of the embodiments may be implemented using software programming or software elements using any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the inventive concept could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

FIG. 1 is a schematic block diagram of an image fusion system 1 according to an exemplary embodiment.

According to the embodiment, referring to FIG. 1, the image fusion system 1 includes a first image sensor 10, a second image sensor 20, an image alignment apparatus 30, an image fusion apparatus 40, and a display apparatus 50.

The first image sensor 10 and the second image sensor 20 may be cameras with different characteristics for capturing the same scene and providing image information. The first image sensor 10 and the second image sensor 20 may be provided with a pan-tilt-zoom (PTZ) function, and thus, may be panned and tilted together to obtain an image in the same position with respective zoom ratios. The first image sensor 10 and the second image sensor 20 may be installed as one body, inside or outside a bank or a public building that needs security as well as an office, a house, a hospital to be used for management of entrance or exit or prevention of crimes. The first image sensor 10 and the second image sensor 20 may have various forms such as a linear type or a dome type according to an installation place and a purpose of use.

In the current embodiment, the first image sensor 10 is a visible-ray camera. The first image sensor 10 may obtain image information using a light detection method, and thus, generate a first image that is a visible image according to brightness distribution of an object. For example, the visible-ray camera may be a camera that uses a charge-coupled device (CCD) or complementary metal-oxide semiconductor (CMOS) as an imaging device.

In the current embodiment, the second image sensor 20 is an infrared-ray camera or a thermal camera. The second image sensor may sense and detect radiant energy (thermal energy), which is emitted by an object, in the form of a wavelength of infrared light which is a type of electromagnetic wave, and measure a strength of the thermal energy, thereby generating a second image which is a thermal image that shows different colors according to the strength.

The image alignment apparatus 30 may perform image alignment by matching locations of points in two or more images of the same scene, which are obtained from different sensors, and aligning the locations in one coordinate system. In the case of a system for obtaining an image using two or more sensors to generate one fusion image, such as a monitoring system or a medical image, image alignment needs to be performed.

The image alignment apparatus 30 aligns the first image, captured by using the first image sensor 10, with a second image, captured by using the second image sensor 20. For this, the image alignment apparatus 30 may estimate a conversion function based on feature point information and motion information, which are extracted from the first image and the second image. The conversion function is a matrix that represents a corresponding relation of feature point information or motion information between the first image and the second image. The image alignment apparatus 30 aligns the first image with the second image by applying the estimated conversion function.

The image fusion apparatus 40 may perform signal processing by outputting a received image signal into a signal that complies with specifications for a display apparatus. The image fusion apparatus 40 fuses the aligned first and second images. For example, an infrared-ray camera may provide a thermal distribution of an object clearly, but may not provide a shape of the object clearly. In contrast, a visible-ray camera may provide a shape of an object clearly, but may not provide a thermal distribution of the object clearly. By appropriately using advantages and disadvantages of the visible-ray camera and the infrared-ray camera, the image fusion apparatus 40 may display an image of an object and, at the same time, a state of thermal distribution of the object.

The image fusion apparatus 40 may reduce noise and perform image signal processing, such as gamma correction, color filter array interpolation, color matrix, color correction, and color enhancement for the first image and the second image, to improve image quality. In addition, the image fusion apparatus 40 may generate an image file by compressing fused image data which is obtained from image signal processing for image improvement, or may restore image data from the image file. An image compression type may include a reversible type or an irreversible type.

Additionally, the image fusion apparatus 40 may perform a function such as color processing, blurring processing, edge emphasis processing, image interpretation processing, image recognition processing, image effect processing, or the like. The image recognition processing may include face recognition processing and scene recognition processing.

The display apparatus 50 provides a fused image, which is output from the image fusion apparatus 40, to a user so that the user may monitor a displayed image. The display apparatus 50 may display a fused image in which the first image and the second image overlap with each other. The display apparatus 50 may be formed of a liquid-crystal display (LCD) panel, an organic light-emitting display (OLED) panel, an electrophoretic display (EPD) panel or the like. The display apparatus 50 is provided in the form of a touch screen that may receive an input via a touch made by a user, and thus, may operate as a user input interface.

Figure 2:
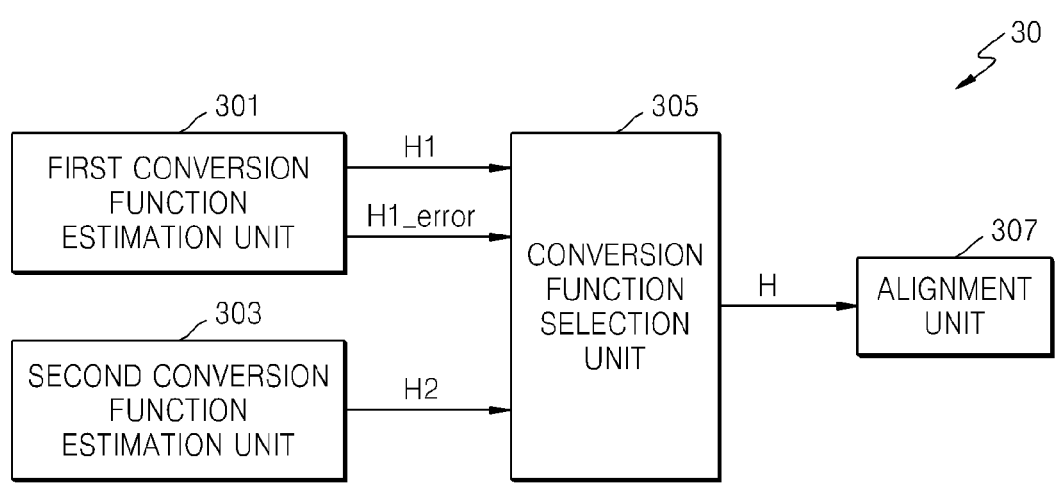
FIG. 2 is a schematic block diagram of an image alignment apparatus according to an exemplary embodiment.

FIG. 2 is a schematic block diagram of the image alignment apparatus 30 according to an exemplary embodiment.

Referring to FIG. 2, the image alignment apparatus 30 may include a first conversion function estimation unit 301, a second conversion function estimation unit 303, a conversion function selection unit 305, and an alignment unit 307.

The first conversion function estimation unit 301 may estimate a first conversion function H1 based on feature point information that is extracted from a first image, captured by the first image sensor 10, and a second image, captured by the second image sensor 20.

In this case, the first conversion function estimation unit 301 may extract feature points from the first image and the second image, and estimate the first conversion function H1 through a process of selecting a pair of corresponding feature points However, if an image, from which a feature point is difficult to detect, is input, the first conversion function H1 may not be estimated, and thus, real-time alignment may be difficult to perform.

Accordingly, in the current embodiment, if the first conversion function estimation unit 301 may not estimate the first conversion function H1, a second conversion function H2 may be estimated by extracting motion information from the first image and the second image so that real-time alignment may be performed.

The second conversion function estimation unit 303 may estimate the second conversion function H2 based on motion information that is extracted from the first image and the second image. If the first conversion function H1 is not estimated, or for a period of time that is predetermined according to a user setting, the second conversion function estimation unit 303 may estimate the second conversion function H2. Accordingly, even if the first conversion function estimation unit 301 may not estimate the first conversion function H1, the second conversion function estimation unit 303 may estimate the second conversion function H1 so that real-time alignment may be performed.

According to whether the first conversion function H1 is estimated, the conversion function selection unit 305 may select the first conversion function H1 or the second conversion function H2 as a final conversion function H. If the first conversion function estimation unit 301 estimates the first conversion function H1 normally (H1_error=0), the conversion function selection unit 305 selects the first conversion function H1 as the final conversion function H. If the first conversion function H1 is not estimated (H1_error=1), the conversion function selection unit 305 selects the second conversion function H2 as the final conversion function H. The conversion function selection unit 305 may select the second conversion function H2 as the final conversion function H for a predetermined period of time. A selection method, performed by selecting the conversion function selection unit 305, is as shown in Equation 1 which is provided below.

$$H = \begin{cases} H1 & \text{if } H1\_\text{error} = 0 \\ H2 & \text{if } H1\_\text{error} = 1 \end{cases} \quad (1)$$

The alignment unit 307 aligns the first image with the second image by using the conversion function H, which is selected from the first conversion function H1 or the second conversion function H2.

Figure 3:
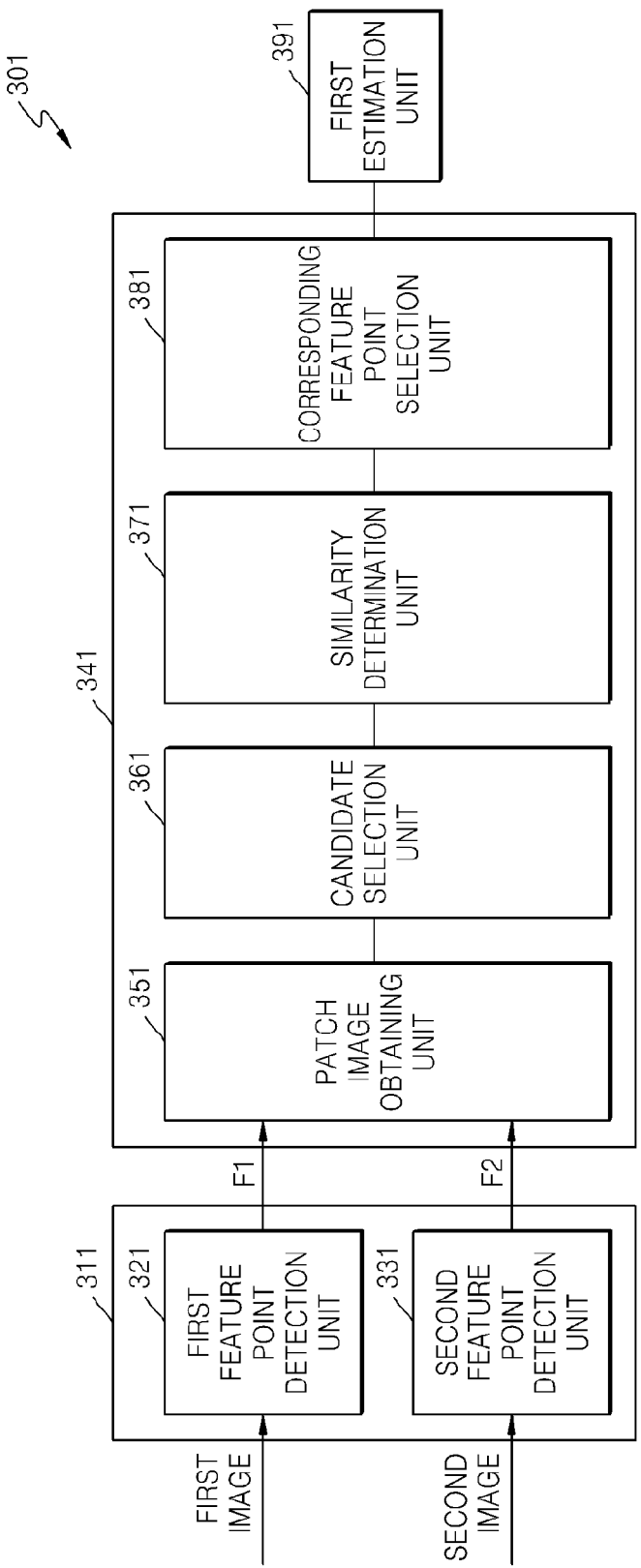
FIG. 3 is a schematic block diagram of a first conversion function estimation unit according to an exemplary embodiment.
Figure 4:
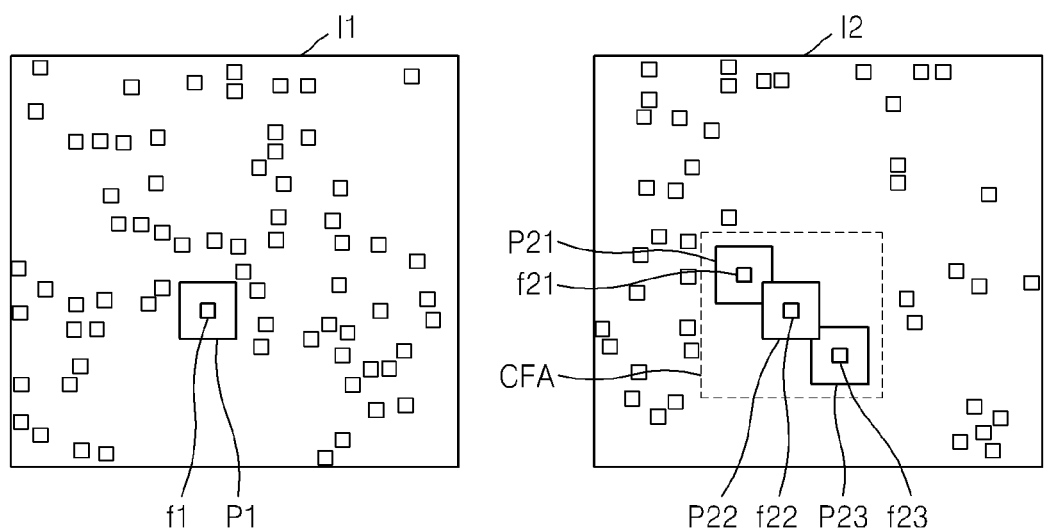
FIG. 4 is a diagram illustrating an example of selecting a feature point according to an exemplary embodiment.

FIG. 3 is a schematic block diagram of the first conversion function estimation unit 301 according to an exemplary embodiment. FIG. 4 is a diagram illustrating an example of selecting a feature point according to an exemplary embodiment.

Referring to FIG. 3, the first conversion function estimation unit 301 may include a feature point detection unit 311, a feature point selection unit 341, and a first estimation unit 391.

The feature point detection unit 311 may include a first feature point detection unit 321 for detecting one or more feature points F1 in a first image, which are captured by using the first image sensor 10, and a second feature point detection unit 331 for detecting one or more feature points F2 in a second image, which are captured by using the second image sensor 20. The first feature point detection unit 321 and the second feature point detection unit 331 are implemented separately or as one body, and thus, may perform detection of one or more feature points sequentially or in parallel.

The feature point detection unit 311 may extract corners, edges, contours, and line intersections as feature points respectively from the first image and the second image, by using a scale-invariant feature transform (SIFT) algorithm, a Harris corner detection algorithm, a smallest univalue segment assimilating nucleus (SUSAN) algorithm or the like. According to an exemplary embodiment, a feature point detection algorithm is not particularly limited, and various feature point detection algorithms may be employed.

The feature point selection unit 341 may select corresponding feature points from among feature points in the first image and the second image. The feature point selection unit 341 may include a patch image obtaining unit 351, a candidate selection unit 361, a similarity determination unit 371, and a corresponding feature point selection unit 381.

The patch image obtaining unit 351 may obtain patch images of respective feature points in the first image and the second image. A patch image may take a form of block with a size of N×N having a feature point at a center of the block.

The candidate selection unit 361 may regard one of the first image and the second image as a reference image, and select candidate feature points in the other image, which may correspond to a feature point in the reference image. The feature points in the two images, which are obtained with regard to the same scene, represent localization. The candidate selection unit 361 may select feature points each of which is disposed in a block, having a predetermined size in the other image with a reference to the feature point in the reference image, as candidate feature points. The size of the block may be flexibly optimized according to a field of view (FOV) and a gazing direction between the two image sensors. For example, if an FOV and a gazing direction between the two image sensors are close to each other, a block size may be reduced. Conversely, if an FOV and a gazing direction between the two image sensors are far from each other, a block size may be increased. The candidate selection unit 361 may select feature points in the other image, each of which is distant from a point in the other image which matches the feature point in the reference image less than a threshold based on the block size, as candidate feature points.

The similarity determination unit 371 may determine a similarity between a patch image of the feature point in the reference image and patch images of the candidate feature points in the other image. The determining of the similarity may be performed by using normalized mutual information and gradient direction information as a parameter. The normalized mutual information is information, which is obtained by normalizing mutual information that represents a statistical correlation between two probability variables. A method of calculating the normalized mutual information and the gradient direction information is performed by using a well-known algorithm and method. Thus, a detailed description thereof will not be provided here.

The corresponding feature point selection unit 381 may select corresponding feature points from among feature points in the reference image and candidate feature points of each feature point in the reference image, based on a result of the determining of the similarity. Specifically, the corresponding feature point selection unit 381 may select a pair of feature points having a highest degree of similarity to each other, from among the feature points in the reference image and the candidate feature points in the other image, as corresponding feature points that correspond to each other. According to an exemplary embodiment, a plurality of pairs of corresponding feature points may be selected by the corresponding feature point selection unit 381.

FIG. 4 shows an example in which feature points are detected respectively from a first image I1 and a second image I2, and a pair of corresponding feature points are selected by referring to the first image I1 as a reference image. With regard to a feature point f1 that is one of a plurality of features points in the first image I1, candidate feature points f21 through f23 in the second image I2 are selected. The candidate feature points f21 through f23 are feature points in the second image I2, which are located in an area CFA within a certain distance from a location that corresponds to the first feature point f1. A similarity between a patch image P1 having the feature point f1 in the first image I1 at a center and patch images P21 through P23 respectively having the candidate feature points f21 through f23 in the second image I2 at a center is determined.

Referring back to FIG. 3, the first estimation unit 391 may estimate the first conversion function H1 based on the selected corresponding feature points. The first estimation unit 391 may estimate the first conversion function H1 by using a random sample consensus (RANSAC) or locally optimized RANSAC (LO-RANSAC) algorithm. The first conversion function H1 may be expressed as Equation 2 shown below.

$$H1 = \begin{pmatrix} h_{11}^1 & h_{12}^1 & h_{13}^1 \\ h_{21}^1 & h_{22}^1 & h_{23}^1 \\ h_{31}^1 & h_{32}^1 & h_{33}^1 \end{pmatrix} \quad (2)$$

Respective elements h11 through h33 of the first conversion function H1 includes rotation information about a rotation angle, translation information about a moving distance in the direction of x, y, and z, and scaling information about a degree of scale in the direction of x, y, and z.

Figure 5:
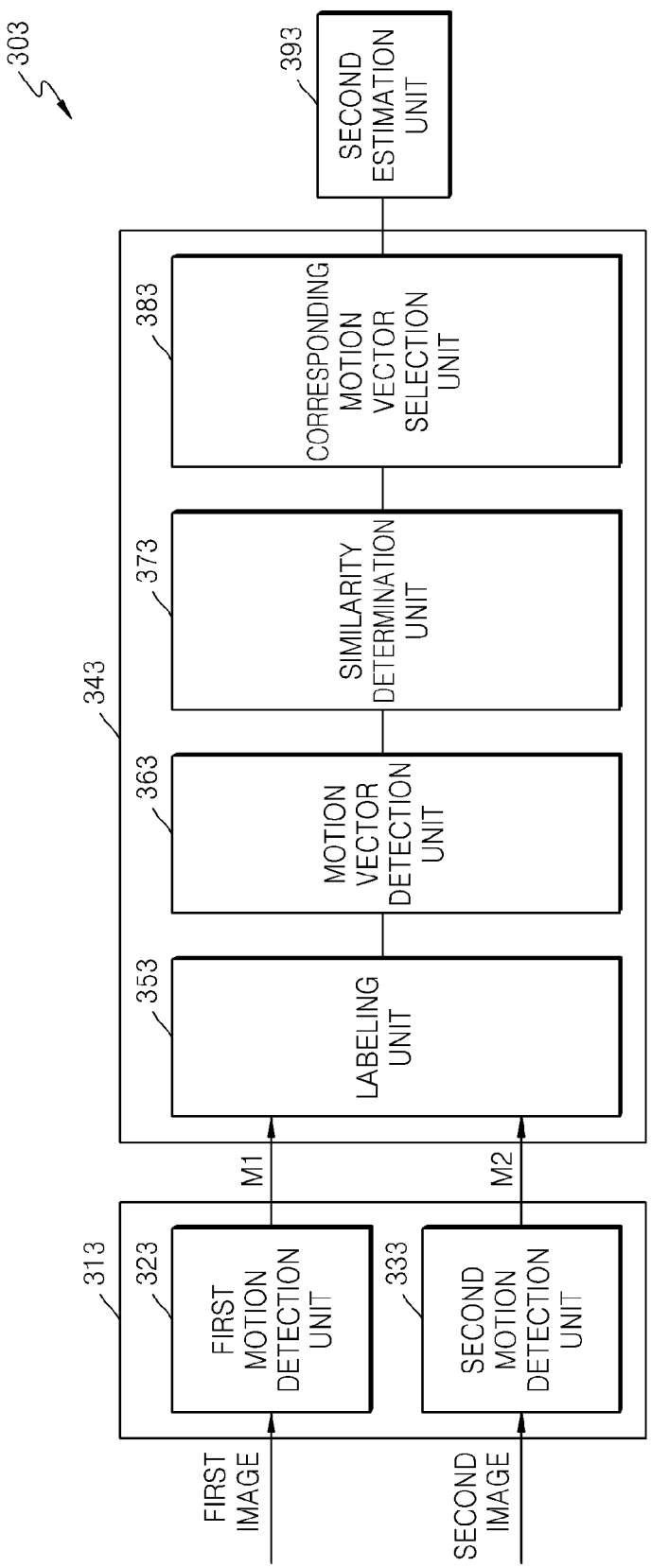
FIG. 5 is a schematic block diagram of a second conversion function estimation unit according to an exemplary embodiment.
Figure 6:
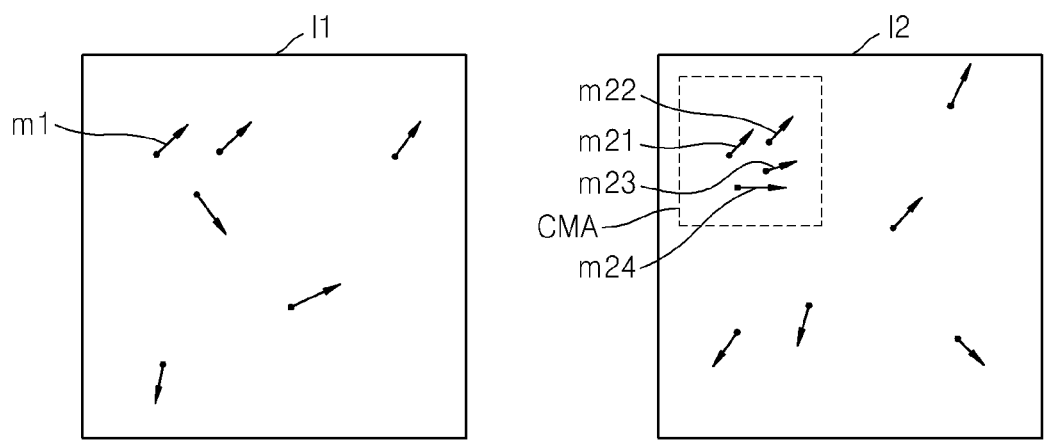
FIG. 6 is a diagram illustrating an example of selecting a motion vector according to an exemplary embodiment.

FIG. 5 is a schematic block diagram of the second conversion function estimation unit 303 according to an exemplary embodiment. FIG. 6 is a diagram illustrating an example of selecting a motion vector according to an exemplary embodiment.

Referring to FIG. 5, the second conversion function estimation unit 303 may include a motion detection unit 313, a motion vector selection unit 343, and a second estimation unit 393.

The motion detection unit 313 may include a first motion detection unit 323 for detecting one or more motions M1 in a first image, which are captured by using the first image sensor 10, and a second motion detection unit 333 for detecting one or more motions M2 in a second image, which are captured by using the second image sensor 20. The first motion detection unit 323 and the second motion detection unit 333 are implemented separately or as one body, and thus, may perform motion detection sequentially or in parallel. According to an exemplary embodiment, a motion detection method is not particularly limited, and various motion detection algorithms may be employed.

The motion vector selection unit 343 may select corresponding motion vectors from among motion vectors that are detected from detected motions in the first and second images. The motion vector selection unit 343 may include a labeling unit 353, a motion vector detection unit 363, a similarity determination unit 373, and a corresponding motion vector selection unit 383.

The labeling unit 353 may label each motion that is detected from the first image and the second image. For example, the labeling unit 353 may label, and thus, classify all detected subjects of motion.

The motion vector detection unit 363 may detect a motion vector for each of labeled motions in the first image and the second image.

The similarity determination unit 373 may determine a similarity between motion vectors in the first image and the second image. The similarity determination unit 373 may regard one of the first image and the second image as a reference image, and select candidate motion vectors in the other image, which may correspond to each of motion vectors in the reference image. The similarity determination unit 373 may select motion vectors in a block, having a predetermined size in the other image with a reference to a motion vector in the reference image, as candidate motion vectors. The size of the block may be flexibly optimized according to a field of view (FOV) and a gazing direction between the two image sensors. For example, if an FOV and a gazing direction between the two image sensors are close to each other, a block size may be reduced. In contrast, if an FOV and a gazing direction between the two image sensors are far from each other, a block size may be increased. The similarity determination unit 373 may select motion vectors in the other image, each of which is distant from a point in the other image which matches the motion vector in the reference image less than a threshold based on the block size, as candidate motion vectors.

The similarity determination unit 373 may determine a similarity between a motion vector in the reference image and candidate motion vectors in the other image. The determining of the similarity may be performed by using a magnitude and a direction of the motion vectors as a parameter.

The corresponding motion vector selection unit 383 may select corresponding motion vectors between the first image and the second image, based on a result of the determining of the similarity. The corresponding motion vector selection unit 383 may select a pair of motion vectors having a highest degree of similarity to each other, from among the motion vectors in the reference image and the candidate motion vectors in the other image, as corresponding motion vectors that correspond to each other. According to an exemplary embodiment, a plurality of pairs of motion vectors may be selected by the corresponding motion vector selection unit 381.

FIG. 6 shows an example in which motion vectors are detected respectively from the first image I1 and the second image I2, and a pair of corresponding motion vectors are selected by referring to the first image I1 as a reference image. With regard to a motion vector m1 that is one of a plurality of motion vectors in the first image I1, candidate motion vectors m21 through m24 in the second image I2 are selected. The candidate motion vectors m21 through m24 are motion vectors that are located in an area CMA that is within a certain distance from a location that corresponds to a motion in the second image I2. A degree of similarity between the motion vector m1 in the first image I1 and the candidate motion vectors m21 through m24 in the second image I2 is determined.

Referring back to FIG. 5, the second estimation unit 393 may estimate the second conversion function H2 based on the selected corresponding motion vectors. The second estimation unit 393 may estimate the second conversion function H2 by using an RANSAC or LO-RANSAC algorithm. The second conversion function H2 may be expressed as Equation 3 shown below.

$$H2 = \begin{pmatrix} h_{11}^2 & h_{12}^2 & h_{13}^2 \\ h_{21}^2 & h_{22}^2 & h_{23}^2 \\ h_{31}^2 & h_{32}^2 & h_{33}^2 \end{pmatrix} \quad (3)$$

Respective elements h11 through h33 of the second conversion function H2 includes rotation information about a rotation angle, translation information about a moving distance in the direction of x, y, and z, and scaling information about a degree of scale in the direction of x, y, and z.

Figure 7:
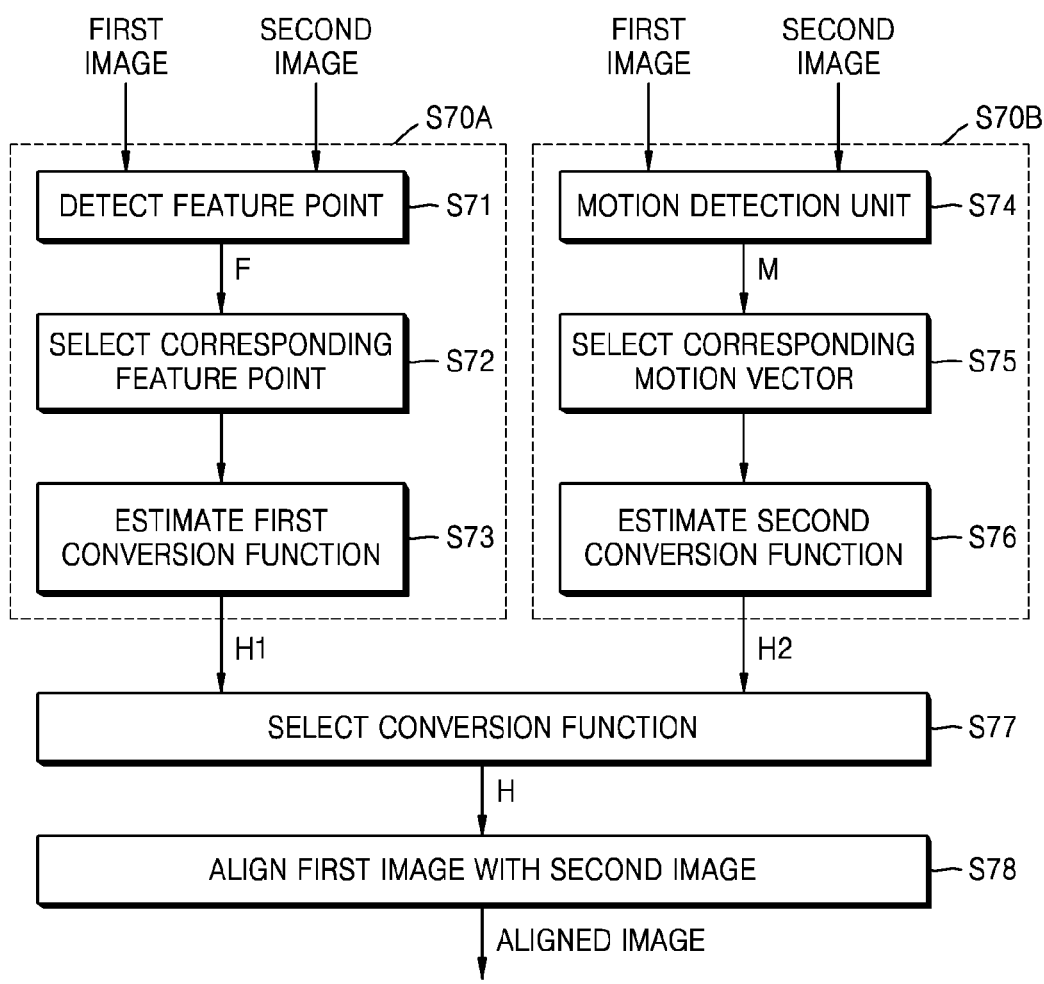
FIG. 7 is a flowchart for illustrating an image alignment method according to an exemplary embodiment.
Figure 8:
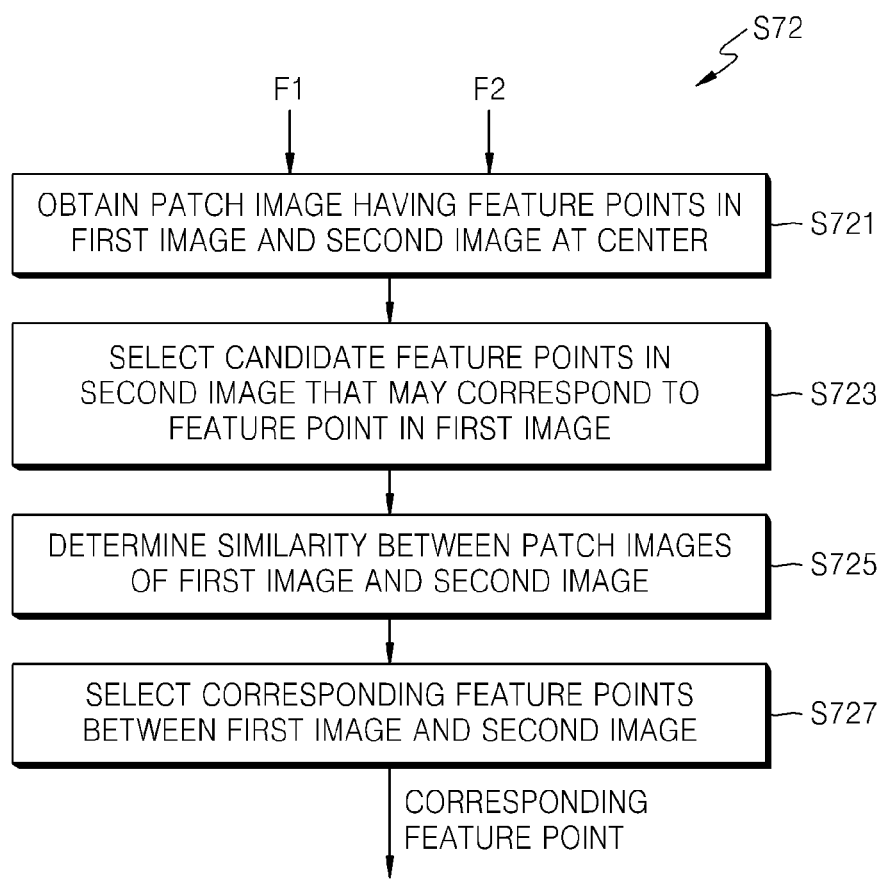
FIG. 8 is a flowchart for illustrating a method of selecting a corresponding feature point shown in FIG. 7, according to an exemplary embodiment.

FIG. 7 is a flowchart for illustrating an image alignment method according to an exemplary embodiment. FIG. 8 is a flowchart for illustrating a method of selecting a corresponding feature point shown in FIG. 7, according to an exemplary embodiment. FIG. 9 is a flowchart for illustrating a method of selecting a corresponding motion vector, according to an exemplary embodiment.

According to the embodiment, referring to FIG. 7, in operation S70A, an image alignment apparatus may estimate the first conversion function H1 based on feature point information that is extracted from a first image, captured by using the first image sensor 10, and a second image, captured by using the second image sensor 20.

In detail, in operation S71, the image alignment apparatus may detect feature points F1 and F2 in the first image and the second image. The feature points may include corners, edges, contours, and line intersections.

Then, in operation S72, the image alignment apparatus may select corresponding feature points, from among the feature points F1 and F2 in the detected first and second images. For this, in operation S721, the image alignment apparatus may obtain patch images, respectively having the feature points F1 and F2 at a center. Then, in operation S723, the image alignment apparatus may select feature points in the other image, which may correspond to a feature point in a reference image that is one of the first image and the second image. For example, if the first image is regard as the reference image, candidate feature points in the second image, which may correspond to a feature point in the first image, may be selected. The candidate feature points may be selected based on localization, for example, a distance between the feature points. Additionally, in operation S725, the image alignment apparatus may determine a similarity between a patch image of the feature point in the reference image and patch images of the candidate feature points in the other image. A degree of the similarity may be determined by using normalized mutual information and gradient direction information. In operation S727, based on a result of the determining of the similarity, the image alignment apparatus may select corresponding feature points that correspond to each other from among the feature points in the reference image and the candidate feature points in the other image. For example, the image alignment apparatus may select candidate feature points, which have a highest degree of similarity to each other, as corresponding feature points.

Then, in operation S73, the image alignment apparatus may estimate the first conversion function H1 based on the selected corresponding feature points.

When the first conversion function H1 is estimated, in operation S77, the image alignment apparatus may select the first conversion function H1 as the final conversion function H.

In operation S78, the image alignment apparatus may align the first image with the second image by regarding the first conversion function H1 as the final conversion function H.

In operation S70B, the image alignment apparatus may estimate the second conversion function H2, based on motion information that is extracted from the first image, captured by using the first image sensor, and the second image, captured by using the second image sensor. If the first conversion function H1 is not estimated, or with a predetermined time interval, the image alignment apparatus may estimate the second conversion function H2.

In operation S74, in detail, the image alignment apparatus may detect the motions M1 and M2 in the first image and the second image.

Then, in operation S75, the image alignment apparatus may select corresponding motion vectors, from among motion vectors that are detected from the detected motions M1 and M2 in the first and second images. For this, in operation S751, the image alignment apparatus may label each motion that is detected from the first image and the second image. Then, in operation S753, the image alignment apparatus may detect motion vectors with regard to the labeled motions. In operation S755, the image alignment apparatus may determine a similarity between the motion vectors in the first image and the second image. For example, if the first image is regarded as a reference image and the second image is regarded as the other image, with regard to respective motion vectors in the first image, candidate motion vectors in the second image that may correspond to each of the motion vectors in the first image, may be selected. Then, a similarity between the motion vector in the reference image and the candidate motion vectors in the other image may be determined. A degree of the similarity may be determined by using magnitude and direction information of motion vectors. In operation S757, based on a result of the determining of the similarity, the image alignment apparatus may select corresponding motion vectors between the first image and the second image. For example, the image alignment apparatus may select motion vectors in the reference image and the other image, which have a highest degree of similarity to each other, as corresponding motion vectors.

Then, in operation S76, the image alignment apparatus may estimate the second conversion function H2 based on the selected corresponding motion vectors.

If the first conversion function H1 is not estimated, in operation S77, the image alignment apparatus may select the second conversion function H2 as the final conversion function H until the first conversion function H1 is estimated.

In operation S78, the image alignment apparatus may regard the second conversion function H2 as the final conversion function H, and thus, align the first image with the second image.

In the embodiments described above, as an example, the first image is described as a visual image and the second image is a thermal image. However, the inventive concept is not limited thereto. The inventive concept may be applied to even such a case that a first image and a second image are obtained from different viewpoints or at different points of time from each other or obtained from sensors that have different characteristics from each other, other than the visual camera and the infrared-ray camera.

The above embodiments may be applied to monitoring of an alert area such as a general out post (GOP), monitoring of forest fire or the like, which needs 24-hour real-time monitoring, monitoring of building or house trespassing in a non-light source environment or a non-illumination environment, tracking of a missing person or a criminal in a place such as a mountain, or the field of a medical image. According to an exemplary embodiment, if an image that does not include a feature point is input, an image alignment apparatus may perform real-time image alignment by detecting a motion.

In addition, the above embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code. At least one of the components or units shown in FIGS. 2, 3 and 5 may represent a module, a program, or a part of code, which contains one or more executable instructions for performing logic functions or operations described above. It should also be noted that the at least one of the components or units may be implemented by a dedicated hardware-based system for performing the logic functions or operations, by a software-based system for performing specified functions or operations, or by a combination of dedicated hardware and computer instructions.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the above exemplary embodiments should be considered in a descriptive sense only and not for purposes of limitation. Descriptions of features or aspects within each embodiment should typically be considered as available for other similar features or aspects in other embodiments.

While the above exemplary embodiments have been described with reference to the drawings, it will be understood by those of ordinary skill in the art that various changes in form and details may be made therein without departing from the spirit and scope of the inventive concept as defined by the following claims.

What is claimed is:

1. An image alignment apparatus comprising a hardware processor to implement:
   a first conversion function estimation unit configured to estimate a first conversion function based on feature point information, the feature point information being extracted from a first image, which is captured by using a first image sensor, and a second image, which is captured by using a second image sensor that is different from the first image sensor;
   a second conversion function estimation unit configured to estimate a second conversion function based on a similarity between a first motion vector in the first image and a second motion vector in the second image; and
   an alignment unit configured to align the first image with the second image by using the first or second conversion function.

2. The image alignment apparatus of claim 1, further comprising a conversion function selection unit implemented by the hardware processor, the conversion function selection unit configured to, according to whether the first conversion function is estimated, select the first conversion function or the second conversion function as a final conversion function.

3. The image alignment apparatus of claim 1, wherein, if the first conversion function is not estimated, or periodically, the second conversion function selection unit estimates the second conversion function.

4. The image alignment apparatus of claim 1, wherein the first conversion function selection unit comprises:
   a feature point detection unit configured to detect feature points in the first image and the second image, respectively;
   a feature point selection unit configured to select corresponding feature points from among the detected feature points in the first image and the second image; and
   a first estimation unit for estimating the first conversion function based on the selected corresponding feature points.

5. The image alignment apparatus of claim 4, wherein the feature point selection unit comprises:
   a patch image obtaining unit configured to obtain patch images having the feature points in the first image and the second image at centers of the patch images, respectively;
   a candidate selection unit, with regard to the feature point in the first image, configured to select candidate feature points in the second image, which correspond to the feature point in the first image;
   a similarity determination unit configured to determine a similarity between the patch image of the feature point in the first image and the patch images of the candidate feature points in the second image; and
   a corresponding feature point selection unit, based on a result of the determining of the similarity, configured to select the corresponding feature points from among the feature point in the first image and the candidate feature points in the second image.

6. The image alignment apparatus of claim 1, wherein the second conversion function estimation unit comprises:
   a motion detection unit configured to detect motions in the first image and the second image, respectively;
   a motion vector selection unit configured to select corresponding motion vectors from among motion vectors that are detected from the detected motions in the first image and the second image; and
   a second estimation unit configured to estimate the second conversion function based on the selected corresponding motion vectors.

7. The image alignment apparatus of claim 6, wherein the motion vector selection unit comprises:
   a labeling unit configured to label each of the detected motions that are detected from the first image and the second image;
   a motion vector detection unit configured to detect the motion vectors with regard to the labeled motions in the first image and the second image;
   a similarity determination unit configured to determine a similarity between the detected motion vectors in the first image and the second image; and
   a corresponding motion vector selection unit, based on a result of the determining of the similarity, configured to select corresponding motion vectors between the first image and the second image.

8. The image alignment apparatus of claim 7, wherein, with regard to the motion vector in the first image, the similarity determination unit is configured to select candidate motion vectors in the second image, and determine a similarity between the motion vector in the first image and the candidate motion vectors in the second image.

9. The image alignment apparatus of claim 8, wherein the similarity determination unit is configured to determine the similarity based on a magnitude and a direction of the detected motion vectors.

10. An image alignment method comprising:
    estimating a first conversion function based on feature point information, the feature point information being extracted from a first image, which is captured by using a first image sensor, and a second image, which is captured by using a second image sensor that is different from the first image sensor;

estimating a second conversion function based on a similarity between a first motion vector in the first image and a second motion vector in the second image; and aligning the first image with the second image by using the first or second conversion function.

11. The image alignment apparatus of claim 10, further comprising, according to whether the first conversion function is estimated, selecting the first conversion function or the second conversion function as a final conversion function.

12. The image alignment apparatus of claim 11, wherein the estimating of the second conversion function is performed, if the first conversion function is not estimated, or periodically.

13. The image alignment apparatus of claim 11, wherein, the estimating of the first conversion function comprises:
   detecting feature points in the first image and the second image, respectively;
   selecting corresponding feature points from among the detected feature points in the first image and the second image; and
   estimating the first conversion function based on the selected corresponding feature points.

14. The image alignment apparatus of claim 13, wherein the selecting of the corresponding feature points comprises:
   obtaining patch images having the feature points in the first image and the second image at the centers of the patch images, respectively;
   with regard to the feature point in the first image, selecting candidate feature points in the second image, which correspond to the feature point in the first image;
   determining a similarity between the patch image of the feature point in the first image and the patch images of the candidate feature points in the second image; and
   based on a result of the determining of the similarity, selecting the corresponding feature points from among the feature point in the first image and the candidate feature points in the second image.

15. The image alignment apparatus of claim 11, wherein the estimating of the second conversion function comprises:
   detecting motions in the first image and the second image, respectively;
   selecting corresponding motion vectors from among motion vectors that are detected from the detected motions in the first image and the second image; and
   estimating the second conversion function based on the selected corresponding motion vectors.

16. The image alignment apparatus of claim 15, wherein the selecting of the corresponding motion vectors comprises:
   labeling each of the detected motions that are detected from the first image and the second image;
   detecting the motion vectors with regard to the labeled motions in the first image and the second image;
   determining a similarity between the detected motion vectors in the first image and the second image; and
   based on a result of the determining of the similarity, selecting corresponding motion vectors between the first image and the second image.

17. The image alignment apparatus of claim 16, wherein the determining of the similarity comprises, with regard to the motion vector in the first image, selecting candidate motion vectors in the second image, and determining a similarity between the motion vector in the first image and the candidate motion vectors in the second image.

18. The image alignment apparatus of claim 16, wherein the determining of the similarity comprises determining the similarity based on a magnitude and a direction of the detected motion vectors.

19. The image alignment apparatus of claim 1, wherein the first image sensor comprises a visible-ray camera and the second image sensor comprises at least one of an infrared-ray camera and a thermal camera.

* * * * *